US007162687B2

(12) United States Patent
Pelegri-Llopart et al.

(10) Patent No.: US 7,162,687 B2
(45) Date of Patent: Jan. 9, 2007

(54) JSP TAG LIBRARIES AND WEB SERVICES

(75) Inventors: Eduardo Pelegri-Llopart, Menlo Park, CA (US); Daniel J. Mandell, Wyncote, PA (US)

(73) Assignee: Sun Microsystems, Inc., Santa Clara, CA (US)

( * ) Notice: Subject to any disclaimer, the term of this patent is extended or adjusted under 35 U.S.C. 154(b) by 410 days.

(21) Appl. No.: 10/159,866

(22) Filed: May 31, 2002

(65) Prior Publication Data

US 2003/0226107 A1 Dec. 4, 2003

(51) Int. Cl.
*G06F 17/00* (2006.01)
*G06F 15/00* (2006.01)

(52) U.S. Cl. .................... 715/501.1; 715/513; 715/523

(58) Field of Classification Search ............. 715/501.1, 715/523, 513
See application file for complete search history.

(56) References Cited

U.S. PATENT DOCUMENTS

| 6,675,354 | B1* | 1/2004 | Claussen et al. ............ 715/513 |
|---|---|---|---|
| 6,715,129 | B1* | 3/2004 | Hind et al. .................. 715/513 |
| 6,981,212 | B1* | 12/2005 | Claussen et al. ............ 715/513 |
| 7,000,185 | B1* | 2/2006 | Murren et al. ............... 715/536 |
| 2002/0122054 | A1* | 9/2002 | Hind et al. .................. 345/731 |
| 2002/0138556 | A1* | 9/2002 | Smithline et al. ........... 709/203 |
| 2002/0174178 | A1* | 11/2002 | Stawikowski ................ 709/203 |
| 2003/0005411 | A1* | 1/2003 | Gerken ........................ 717/120 |
| 2003/0014483 | A1* | 1/2003 | Stevenson et al. .......... 709/203 |
| 2003/0065810 | A1* | 4/2003 | Ims et al. .................... 709/232 |
| 2003/0078960 | A1* | 4/2003 | Murren et al. ............... 709/203 |
| 2003/0084120 | A1* | 5/2003 | Egli ............................ 709/218 |
| 2003/0093575 | A1* | 5/2003 | Upton ......................... 709/310 |
| 2003/0105884 | A1* | 6/2003 | Upton ......................... 709/318 |
| 2003/0137538 | A1* | 7/2003 | Hesmer et al. ............. 345/760 |
| 2003/0204622 | A1* | 10/2003 | Blizniak et al. ............. 709/241 |
| 2004/0205550 | A1* | 10/2004 | Gerken ........................ 715/513 |

OTHER PUBLICATIONS

"Web Services Description Language (WSDL) 1.1", W3C Note, Mar. 15, 2001, pp. 1-67, (downloaded from: www.w3.org/TR/wsdl).*

(Continued)

*Primary Examiner*—Shahid Alam
*Assistant Examiner*—Robert Stevens
(74) *Attorney, Agent, or Firm*—Martine Penilla & Gencarella, LLP

(57) ABSTRACT

An invention is provided for incorporating web services into JSP tag libraries for use in JSP pages. As a result, web page authors can develop JSP pages, which utilize web services from WSDL enabled servers, without an in-depth knowledge of WSDL. In general, a web services based document is received, which defines a set of web service operations. Each web service operation is translated into a custom action, and the custom actions are grouped into a tag library. Generally, the web services based document can be a WSDL document, and the custom actions can be JSP custom actions. Also, the tag library can be a JSP custom tag library. Particular custom actions from the custom actions that are grouped in the JSP custom tag library can be incorporated in a JSP page. Once the JSP page is created, content for the JSP page can be obtained from a web service using the JSP custom tag library. The JSP page can then generate a document based on the content. The document can be an HTML document, an XML document, or any other type document as needed for the particular situation.

8 Claims, 6 Drawing Sheets

OTHER PUBLICATIONS

Siddiqui, Bilal, "Deploying Web Services with WSDL: Part 1, Introduction to Web Services and WSDL", IBM developerWorks, Nov. 1, 2001, pp. 1-6, (downloaded from: http://www-128.ibm.com/developerworks/webservices/library/ws-intwsdl/index.html).*

Coentraets, Christophe, "Web Services: Building the Next Generation of E-Business Applications", © Macromedia, Oct. 2, 2001, pp. 1-12.*

CapeStudio 3 Technical Overview, © Cape Clear Software, Mar. 2002, pp. 1-19.*

Ayers, Danny, et al., Professional Java Server Programming, Wrox Press, Ltd., Dec. 1999, pp. 123-154.*

* cited by examiner

JSP TAG LIBRARIES AND WEB SERVICES

BACKGROUND OF THE INVENTION

1. Field of the Invention

This invention relates generally to computer networking, and more particularly to JavaServer Pages tag libraries incorporating web services.

2. Description of the Related Art

With the growing popularity of the World Wide Web, dependence on web-based services is becoming increasingly prolific. Part of this dependence includes the dependence on dynamically changing web pages, such as search engine pages, news pages, and web shopping pages. One technology utilized today to provide dynamic web pages is JavaServer Pages (JSP) from Sun Microsystems, Inc.

JSP technology allows web developers and designers to rapidly develop and easily maintain, information-rich, dynamic web pages that leverage existing business systems. As part of the Java family, JSP technology enables rapid development of web-based applications that are platform independent. In addition, JSP technology separates the user interface from content generation enabling designers to change the overall page layout without altering the underlying dynamic content.

FIG. 1 is a block diagram showing an exemplary prior art JSP based server configuration 100. As shown in FIG. 1, the JSP based server configuration operates in a manner similar to a static web page. That is, a browser 102 requests a web page, such as a Hypertext Markup Language (HTML) document, from the server. However, unlike a static web page server, a server designed using a JSP based server configuration 100 includes a JSP page 104, which generates the HTML dynamically.

In particular, the JSP page 104 uses XML-like tags and scriptlets written in the Java programming language to encapsulate logic that generates the content for the HTML document 108. Additionally, application logic can reside in server-based resources (such as JavaBeans component architecture) that the JSP page 104 accesses using the tags and scriptlets. In this manner, the JSP page 104 can receive content 106 from a content source, such as separate program executing on the server, and process the received content 106 to dynamically create the HTML document 108. Once generated, the HTML document 108 is transmitted back to the browser 102.

Web Services Description Language (WSDL) based programs currently are utilized to request actions and content from web locations. WSDL is an extensible markup language (XML) format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate.

For example, FIG. 2 is a block diagram showing an exemplary prior art WSDL based server configuration 200. The WSDL based server configuration 200 includes a WSDL endpoint 202, which provides an entry point for external applications to access the logic 204 that provides the actual web services. In operation, an application 206 can access the logic 204 using a WSDL document 208 describing the WSDL endpoint 202.

Broadly speaking, the WSDL document 208 defines services as collections of network endpoints, or ports. In WSDL, the abstract definition of endpoints and messages is separated from their concrete network deployment or data format bindings. This allows the reuse of abstract definitions: messages, which are abstract descriptions of the data being exchanged, and port types, which are abstract collections of operations. The concrete protocol and data format specifications for a particular port type constitute a reusable binding. A port is defined by associating a network address with a reusable binding. A collection of ports defines a service. In this manner, the application 206 can utilize the web services in an abstract and network independent manner.

Although web page generation has been made easily accessible to the public through various web authoring tools, WSDL utilization is not widely available because of the complexity involved in its usage. That is, conventional systems do not provide a mechanism for easily incorporating data from web services into web pages viewable using a browser. As a result, incorporating content obtained through web services or other network sources into dynamic web pages is a laborious and time intensive task.

Hence, in view of the foregoing, there is a need for systems and methods for incorporating web services into dynamic web pages. The methods should allow web services to be utilized in conjunction with dynamic web pages. In addition, the methods should be easily portable for use in web authoring tools.

SUMMARY OF THE INVENTION

Broadly speaking, the present invention fills these needs by providing a mechanism for incorporating web services into JSP tag libraries for use in JSP pages. As a result, web page authors can develop JSP pages, which utilize web services from WSDL enabled servers, without an in-depth knowledge of WSDL. In one embodiment, a method is disclosed for providing dynamic web pages based on web services. A web services based document is received, which defines a set of web service operations. Each web service operation is translated into a custom action, and the custom actions are grouped into a tag library. Generally, the web services based document can be a WSDL document, and the custom action can be a JSP custom action. Also, the tag library can be a JSP custom tag library. In addition, particular custom actions from the custom actions that are grouped in the JSP custom tag library can be incorporated in a JSP page. Once the JSP page is created, content for the JSP page can be obtained from a web service using the JSP custom tag library. The JSP page can then generate a document based on the content. As will be explained subsequently, the document can be an HTML document, an XML document, or any other type document as needed for the particular situation.

In an additional embodiment, a system for providing dynamic web pages based on web services is disclosed. The system includes a server and a JavaServer pages (JSP) page, which is executed on the server. The JSP page utilizes a custom tag library that provides a plurality of custom actions. Each custom action provides web services defined in a web services based document. In this manner, the JSP page receives content from web services using custom actions defined in the custom tag library, and generates a document based on the content. As above, the web services based document can be a WSDL document, and each custom action can be a JSP custom action. Generally, the JSP page can incorporate particular custom actions from the custom actions grouped in the JSP custom tag library. Also as above, the document can be an HTML document, an XML document, or any other type document as needed by the system.

A computer program embodied on a computer readable medium for providing web services access for a web page generator is disclosed in a further embodiment of the present invention. The computer program includes a code segment that receives a web services based document. As above, the web services based document defines a set of web service operations. In addition, a code segment is included that translates each web service operation into a custom action. Further, the computer program includes a code segment that groups the custom actions into a tag library. Similar to above, the web services based document can be a WSDL document. Also, the tag library generally is usable by a JavaServer Pages (JSP) page. Thus, a JSP page can generate a document, such as an HTML document, based on content received using the tag library. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for incorporating web services into JSP tag libraries for use in JSP pages. As a result, web page authors can develop JSP pages, which utilize web services from services described through WSDL, without an in-depth knowledge of WSDL. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Embodiments of the present invention provide a mechanism for web authoring that allows easy use of web services from WSDL based servers. Using the embodiments of the present invention, web authoring tools can generate dynamic web pages that obtain content from services described through WSDL. Although the following description will be in terms of JSP technology, it should be noted that embodiments of the present invention can be utilized with any mechanism that can generate HTML or XML documents. It should further be noted that embodiments of the present invention are not limited to WSDL described web services. Hence, embodiments of the present invention can be utilized with any description language used to describe web services.

Figure 1:
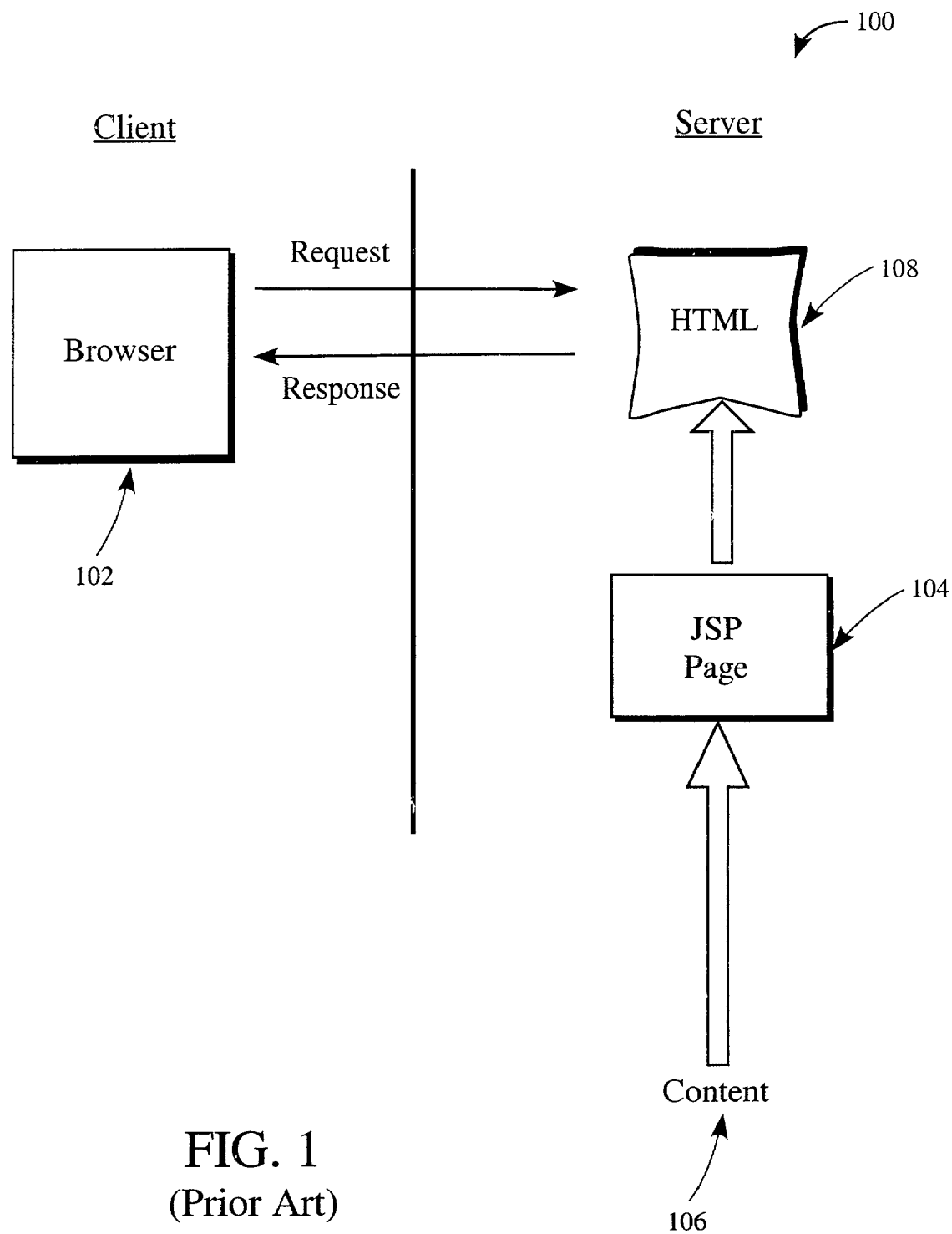
FIG. 1 is a block diagram showing an exemplary prior art JSP based server configuration.
Figure 2:
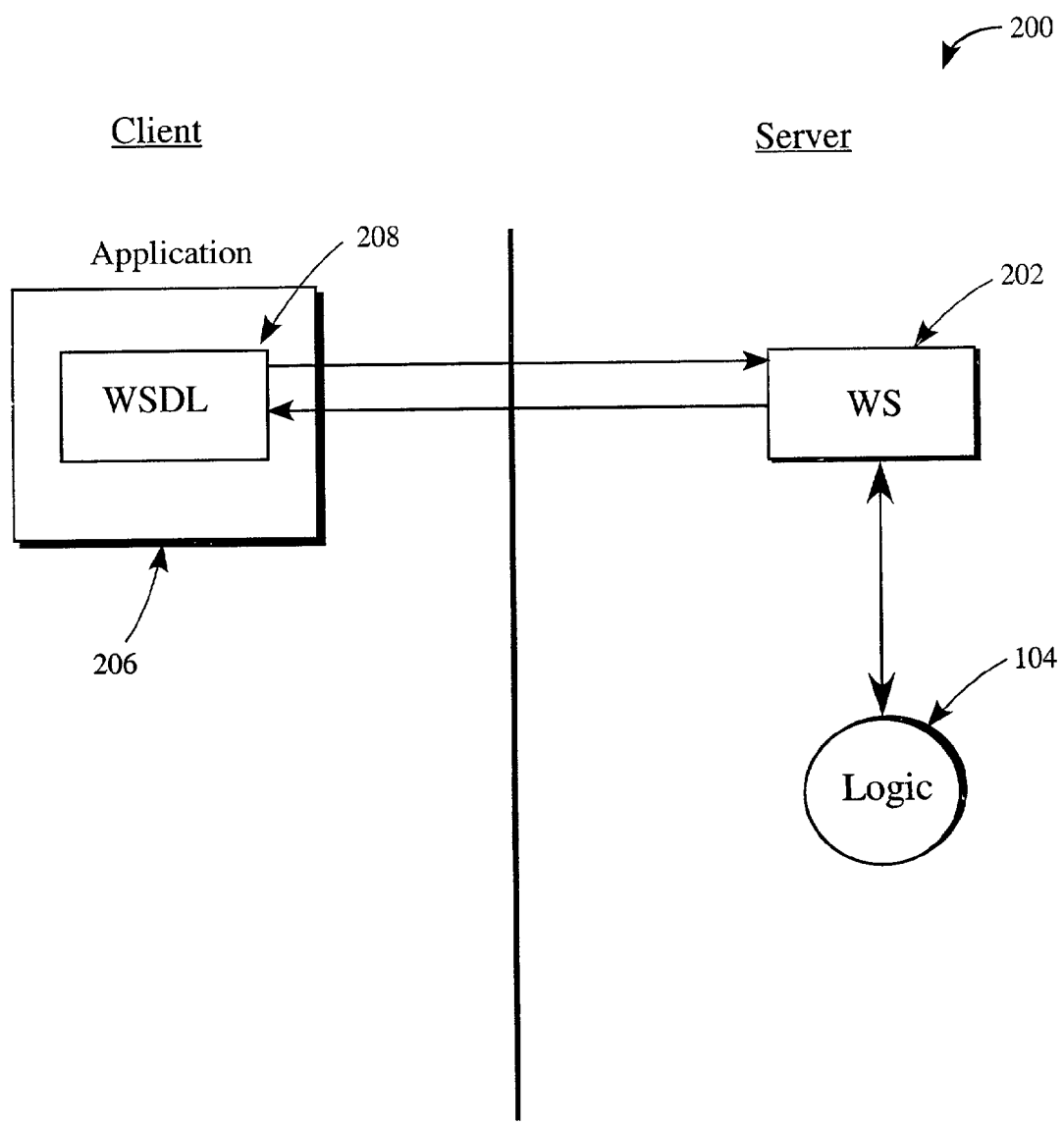
FIG. 2 is a block diagram showing an exemplary prior art WSDL based server configuration.
Figure 3:
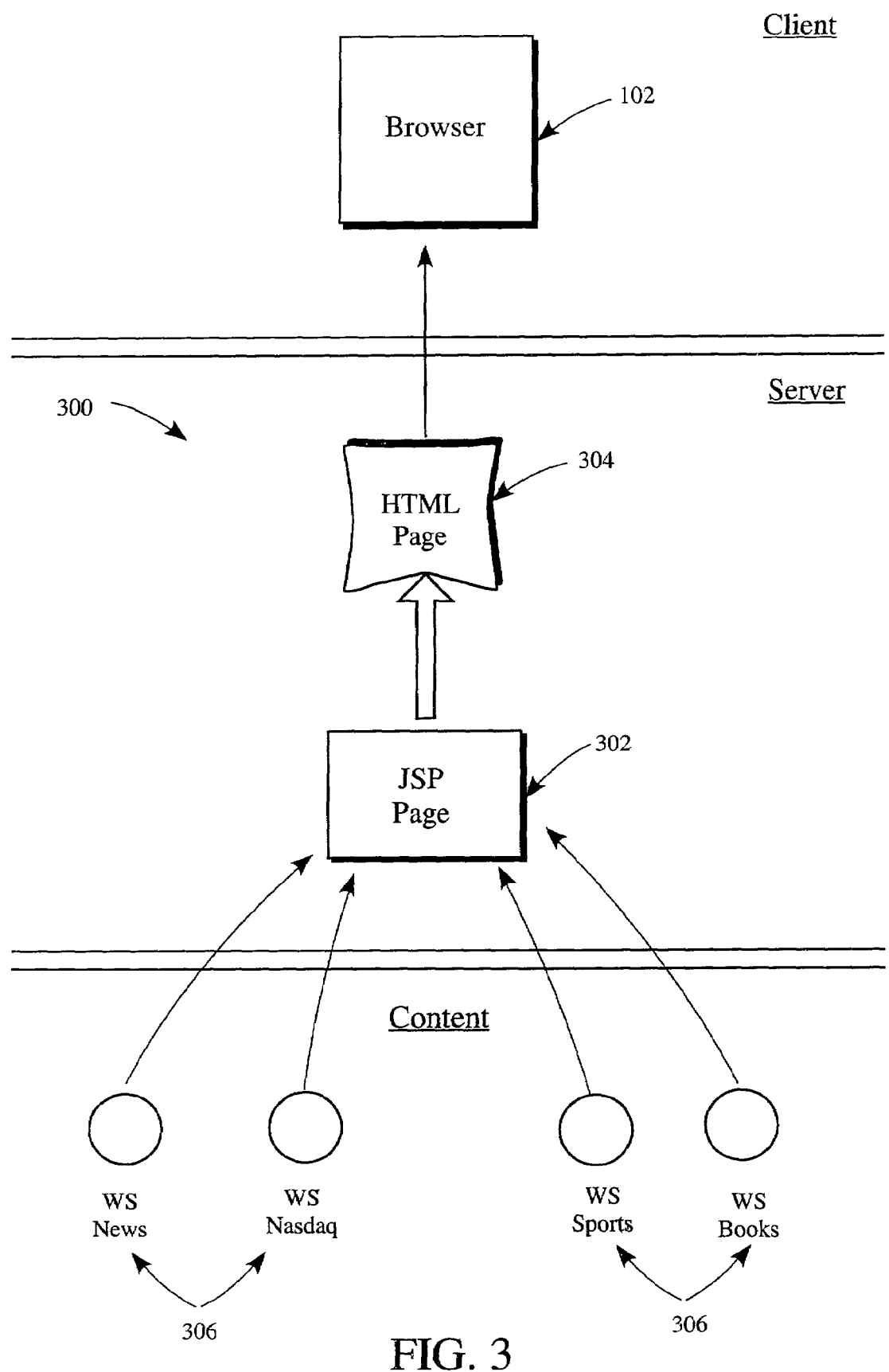
FIG. 3 is a diagram showing a web services (WS) JSP based server configuration, in accordance with an embodiment of the present invention.

FIG. 3 is a diagram showing a web services (WS) JSP based server configuration 300, in accordance with an embodiment of the present invention. The WS JSP server configuration 300 includes a JSP page 302 that dynamically generates HTML documents 304 using content from WSDL endpoints 306 that provide web services. Of course, it should be noted that the embodiments of the present invention are not limited to the generation of HTML documents. XML, text, graphics, word processing documents, and spreadsheets are further examples of documents that can be generated using the embodiments of the present invention.

Broadly speaking, when the JSP page 302 receives a request for a web page from a browser 102, the JSP page 302 generates an HTML document 304 using content obtained from the WSDL endpoints 306. As mentioned above, the abstract definition of endpoints and messages is separated from their concrete network deployment or data format bindings in WSDL. Hence, abstract definitions such as messages and port types can be reused. In this manner, the JSP page 32 can utilize the web services in an abstract and network independent manner.

In operation, the JSP page 302 sends messages to the WSDL endpoints 306 requesting particular content. For example, the JSP page 302 of FIG. 3 may request news from a news WSDL endpoint 306, stock quotes from a NASDAQ WSDL endpoint 306, sports information from a sports WSDL endpoint 306, and book titles from a bookseller WSDL endpoint 306. Upon receiving the messages from the JSP page 302, the WSDL endpoints 306 process the messages and return appropriate content based on the web services requested.

This content is received, typically via the Internet, at the JSP page 302, which processes the received content to generate the HTML document 304. As mentioned above, JSP technology uses XML-like tags and scriptlets written in the Java programming language to encapsulate the logic that generates the content for the page. Scriptlets are sections of Java code inserted into a JSP page and executed each time the JSP page is invoked. Additionally, the application logic can reside in server-based resources (such as JavaBeans component architecture) that the page accesses with the tags and scriptlets. By separating the page logic from its design and display and supporting a reusable component-based design, JSP technology makes building web-based applications fast and relatively easy.

JSP technology is an extension of the Java Servlet technology. Servlets are platform-independent, Java server-side modules that fit seamlessly into a web server framework and can be used to extend the capabilities of a web server with minimal overhead, maintenance, and support. Unlike other scripting languages, servlets involve no platform-specific consideration or modifications. Hence, servlets are Java application components that can be downloaded, on demand, to the part of the system that needs them. Together, JSP technology and servlets provide dynamic web scripting and programming that is platform independent.

Once generated, the HTML document is provided to the requesting browser 102, which processes the HTML document for presentation. In this manner, embodiments of the present invention can be used to provide dynamic web pages, which utilize content from WSDL based servers. To obtain access to the WSDL endpoints 306, the JSP page 302 uses a WS custom tag library, which includes custom actions for performing WSDL operations.

Figure 4:
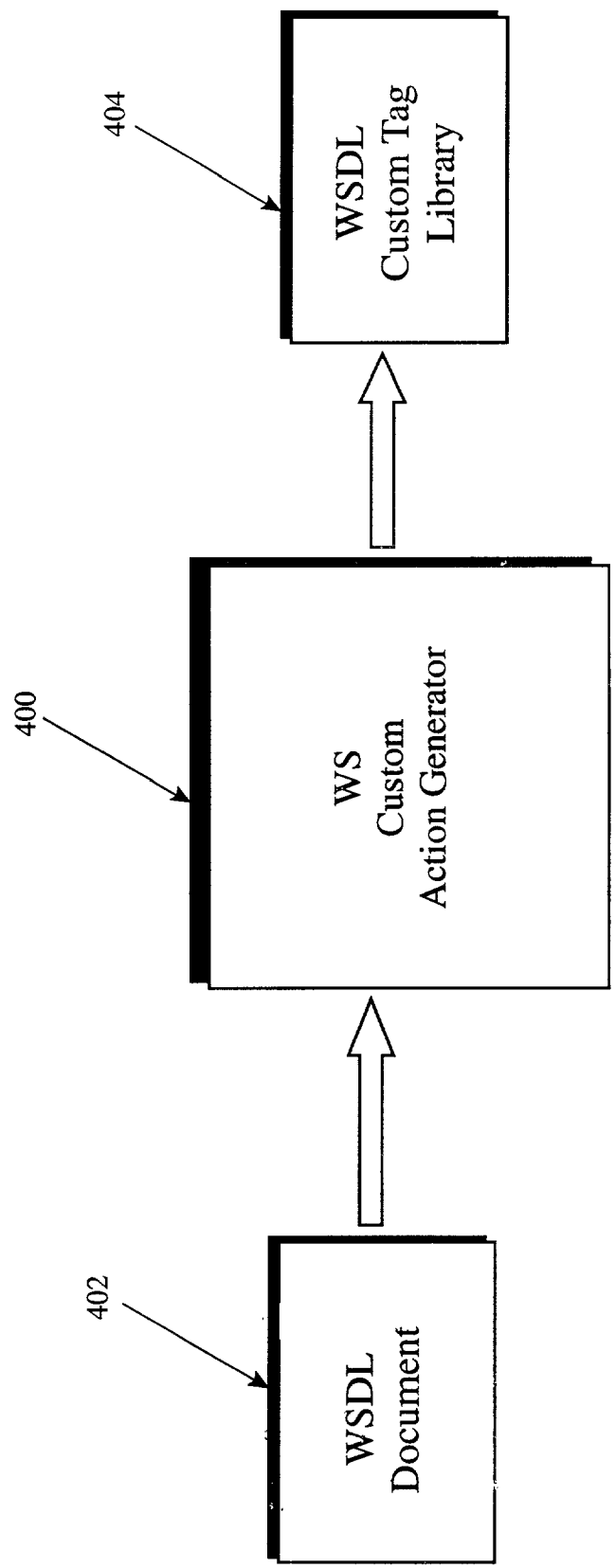
FIG. 4 is a diagram showing WS custom tag library creation using a WS custom action generator, in accordance with an embodiment of the present invention.

FIG. 4 is a diagram showing WS custom tag library creation using a WS custom action generator 400, in accordance with an embodiment of the present invention. In operation, the WS custom action generator 400 receives a WSDL document 402 as input. As discussed previously, the WSDL document 402 defines XML grammar for describing network services as collections of communication endpoints capable of exchanging messages. Hence, the WSDL document 402 provides service definitions that provide documentation for distributed systems and serve as a recipe for automating the details involved in applications communication.

Once received, the WS custom action generator 400 automatically generates a plurality of custom actions corresponding to the WS operations included in the WSDL document 402. The generated custom actions are gathered in a WS custom tag library 404, which can be utilized by any JSP page to perform WSDL operations.

A JSP tag library, such as the WS custom tag library 404, defines declarative, modular functionality that can be reused by any JSP page. Tag libraries reduce the necessity to embed large amounts of Java code in JSP pages by moving the functionality provided by the tags into tag implementation classes. As a result, tag libraries make authoring JSP pages easier, both for the Web page author and for tools that expose the functionality encapsulated by the tag library to the author.

In addition, tag libraries increase productivity by encouraging division of labor between library developers and library users. For example, a developer who is an expert accessing data and other services can create a JSP tag library. Then, web page authors who can focus on the design of user interfaces can utilize the JSP tag library. Further, JSP tag libraries are portable. Thus, JSP tag libraries can be utilized by any JSP page independent of the page's scripting language, any authoring tool supporting tag libraries, and any JSP compliant server.

As mentioned above, the WS custom tag library 404 includes a plurality of WS custom actions. Custom actions are extensions to the JSP language, and are usually distributed in the form of a tag library, which defines a set of related custom actions and contains the objects that implement the tags. A custom action is a user-defined JSP language element. When a JSP page containing custom actions are translated into a servlet, the actions are converted to operations on an object called a tag handler. The web container then invokes those operations when the JSP page's servlet is executed.

In particular, the WS custom actions of the WS custom tag library 404 include a arguments and a body. The arguments and body provide a mechanism for JSP page values to the tag handler, which then passes the values to the service described by the WSDL description. In this manner, a WS custom action invocation template invocation can be incorporated into any JSP page with specific arguments and body values, and utilized to perform WSDL operations via the WS custom tag library 404, as discussed next with reference to FIG. 5.

Figure 5:
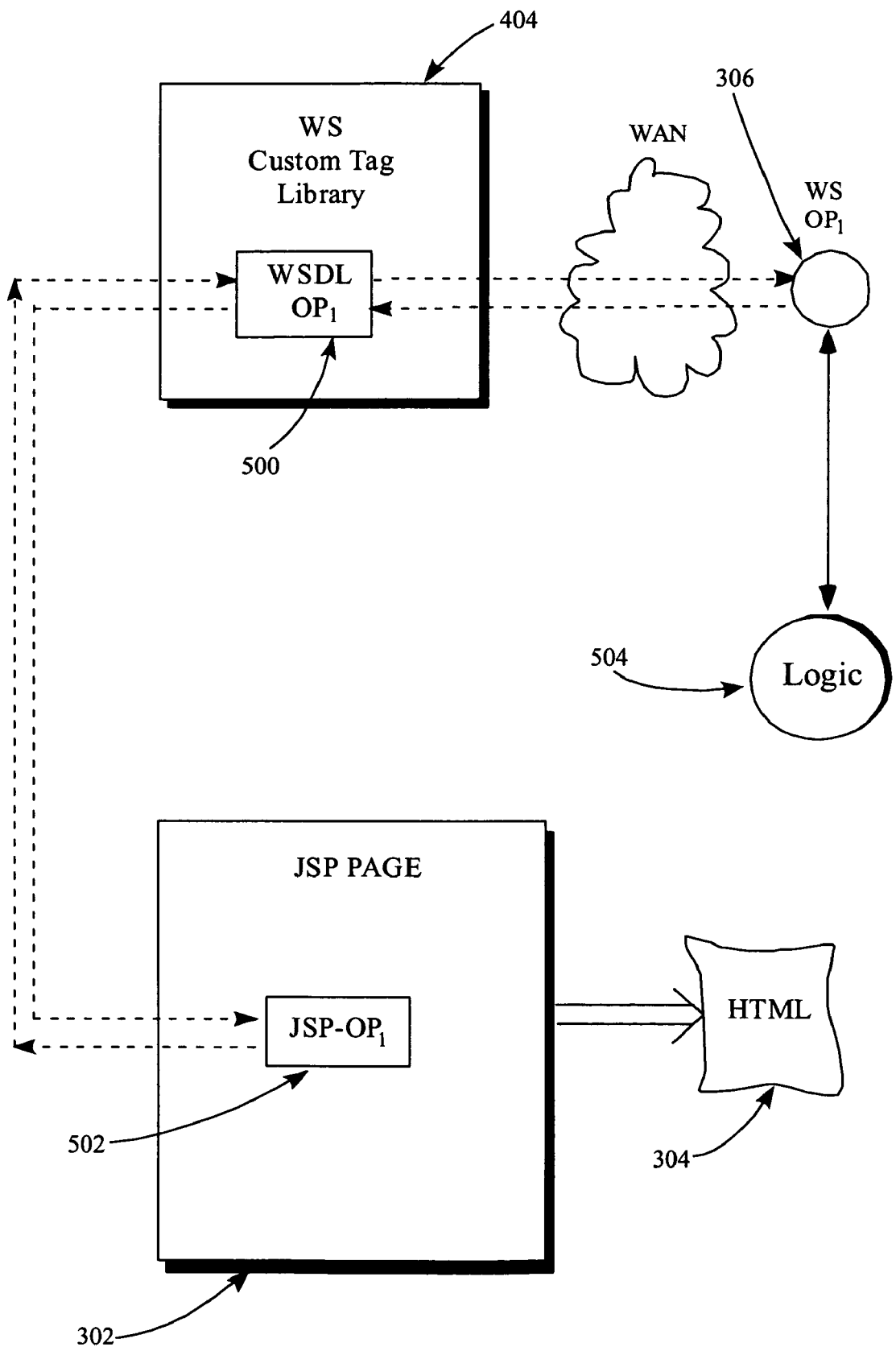
FIG. 5 is a block diagram showing a detailed view WS JSP server configuration, in accordance with an embodiment of the present invention.

FIG. 5 is a block diagram showing a detailed view WS JSP server configuration, in accordance with an embodiment of the present invention. As above, the WS JSP server configuration includes a JSP page 302 that dynamically generates HTML documents 304 using content from a WSDL endpoint 306 that provide web services. In response to a request for a web page from a browser, the JSP page 302 generates the HTML document 304 using content obtained from the WSDL endpoint 306. As mentioned above, the abstract definition of endpoints and messages is separated from their concrete network deployment or data format bindings in WSDL. Hence, abstract definitions such as messages and port types can be reused. In this manner, the JSP page 302 can utilize the web services in an abstract and network independent manner.

The JSP technology includes standard JSP tags for invoking operations on JavaBeans components and performing request dispatching, which simplify JSP page development and maintenance. The JSP page can use a JSP standard tag library (JSTL), which encapsulates, as simple tags, core functionality common to many Web applications. The JSTL has support for common, structural tasks such as iteration and conditionals, tags for manipulating XML documents, internationalization tags, and SQL tags. It also introduces the concept of an expression language to simplify page development, and includes a preliminary version of the JSP expression language. JSTL further provides a framework for integrating existing custom tags with JSTL tags.

A JSP page can also utilize additional tag libraries. For example, to utilize the web services in an abstract and network independent manner, the JSP page 302 utilizes a WS custom tag library 404 that is generated using a WS custom action generator 400 (FIG. 4). The WS custom action generator automatically generates a plurality of custom actions corresponding to the WS operations included in the WSDL document associated with the WS endpoint 306. The generated custom actions are gathered in the WS custom tag library 404, which is utilized by the JSP page 302 to perform WSDL operations.

In particular, a custom action invocation template 502 for a WS custom action is included in the JSP page 302. The position selected for the invocation template 502 is determined by the web page author based on the needs of the dynamic web page to be generated. Of course, although only one invocation template 502 is illustrated in FIG. 5, it should be noted that any number of invocation templates for custom actions can be included in a particular JSP page 302. Further, it should be noted that different custom action invocation templates can be included within the JSP page 302, and specific custom action invocation templates can be repeated throughout the JSP page 302, as determined by the web page author.

Conceptually, when invoked the custom action invocation template 502 passes any arguments and body provided by the JSP page to the corresponding custom action tag handler code 500 within the WS custom tag library 404. The WS custom action tag handler code 500 includes Java code, generally in the form of Java code and WSDL invocations corresponding to the WSDL endpoint 306. Thus, the JSP page 302 can invoke a WS custom action using the custom action invocation template 502, which invokes the Java code within the corresponding custom action tag handler code 500 in the WS custom tag library.

When executed, the custom action tag handler code 500 invokes a WSDL operation, which sends a message to the WSDL endpoint 306. The WSDL endpoint 306, then processes the message using corresponding logic 504, and returns a message having the requested content. The custom action tag handler code 500 in the WS custom tag library 404 receives the message, translates the message into JSP compatible data, and passes the JSP data back to the JSP page 302. The JSP page 302 can then utilize the received data to generate the HTML document 304. It should be noted, however, that FIG. 5 conceptually describes the operations of an embodiment of the present invention. In operation, the JSP page 302 containing the WS custom actions 502 is translated into a servlet, and the actions are converted to operations on an object called a tag handler. Thereafter, a web container invokes those operations when the JSP page's servlet is executed.

Figure 6:
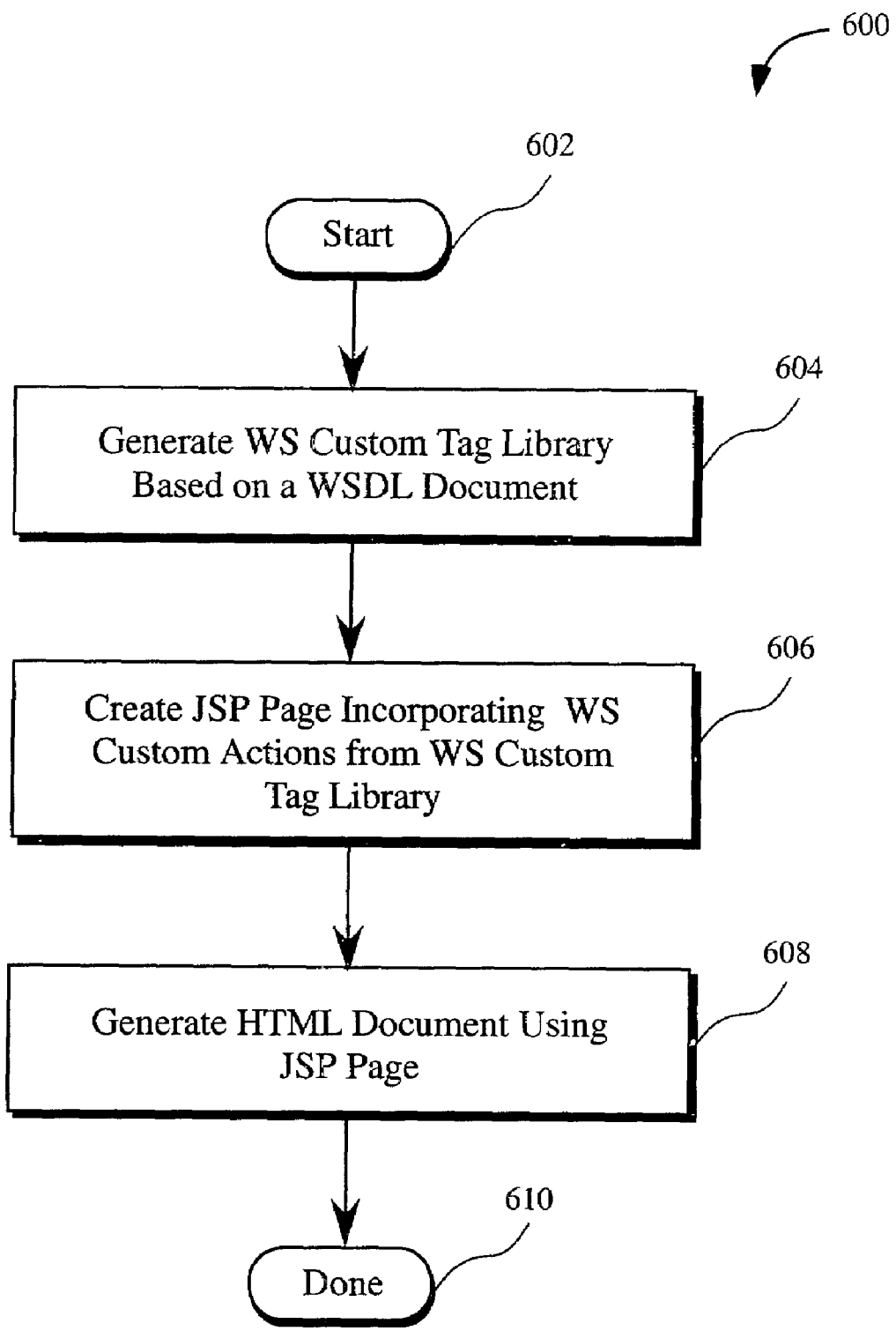
FIG. 6 is a flowchart showing a method for incorporating web services into JSP pages, in accordance with an embodiment of the present invention.

FIG. 6 is a flowchart showing a method 600 for incorporating web services into JSP pages, in accordance with an embodiment of the present invention. In an initial operation 602, preprocess operations are performed. Preprocess operations can include determining which web services to utilize, determining web service URLs, and other preprocess operations that will be apparent to those skilled in the art after a careful reading of the present disclosure.

In operation 604, a WS custom tag library is generated based on a WSDL document. As mentioned above, a WSDL document is provided as input to a WS custom action generator. The WSDL document defines XML grammar for describing network services as collections of communication endpoints capable of exchanging messages. Hence, the WSDL document provides service definitions that provide documentation for distributed systems and serve as a recipe for automating the details involved in applications communication. Once received, the WS custom action generator automatically generates a plurality of custom actions corresponding to the WS operations included in the WSDL document. The generated custom actions are gathered in a WS custom tag library, which can be utilized by any JSP page to perform WSDL operations. Custom actions are extensions to the JSP language, and are usually distributed in the form of a tag library, which defines a set of related custom actions and contains the objects that implement the tags.

A JSP page that incorporates the WS custom actions from the WS custom tag library is created in operation 606. As discussed above, a custom action invocation template for a WS custom action is included in the JSP page. The position selected for the invocation template is determined by the web page author based on the needs of the dynamic web page to be generated. Of course it should be noted that any number of invocation templates for custom actions can be included in a particular JSP page. Further, it should be noted that different custom action invocation templates can be included within the JSP page, and specific custom action invocation templates can be repeated throughout the JSP page, as determined by the web page author.

In operation 608, an HTML document is generated using the JSP page. The JSP page dynamically generates HTML documents using content from WSDL endpoints that provide web services. Of course, it should be noted that the embodiments of the present invention are not limited to the generation of HTML documents. XML, text, graphics, word processing documents, and spreadsheets are further examples of documents that can be generated using the embodiments of the present invention.

The JSP page sends messages to the WSDL endpoints requesting particular content using the WS custom tag library generated in operation 604. Upon receiving the messages from the JSP page, the WSDL endpoints process the messages and return appropriate content based on the web services requested. This content is received, typically via the Internet, at the JSP page, which processes the received content to generate the HTML document.

Post process operations are performed in operation 610. Post process operations can include JSP page maintenance, web services updating, and other post process operations that will be apparent to those skilled in the art after a careful reading of the present disclosure. Advantageously, embodiments of the present invention allow web authors to easily utilize the benefits of web services without requiring an in depth knowledge of WSDL. In addition, the WS custom action generator of the embodiments of the present invention allow tag library developers to create WS custom tag libraries for particular web services in a structured and efficient manner.

Embodiments of the present invention may be practiced with various computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing dynamic web pages based on web services, comprising the operations of:

receiving a document defining a set of web service operations as a collection of endpoints each providing an entry point for external applications to access logic over a network;

translating the web service operations defined by the document into custom actions, each of the custom actions providing a corresponding web service operation as defined in the document;

grouping the custom actions into a custom tag library, wherein said translating is performed automatically by a custom action generator that receives the document as input and automatically generates the custom actions, wherein the document is a web services description language (WSDL) document, the custom action is a JavaServer pages (JSP) custom action, and the custom tag library is a JSP custom tag library; and creating a JSP page, the JSP page incorporating at least one of the custom actions from the custom actions grouped in the JSP custom tag library, obtaining content for the JSP page using the JSP custom tag library, the content provided by at least one web service, and generating a web document using the JSP page, wherein the web document is generated based on the content.

2. A method as recited in claim 1, wherein the web document generated by the JSP page is a hypertext markup language (HTML) document.

3. A method as recited in claim 1, wherein the web document generated by the JSP page is a extensible markup language (XML) document.

4. A method for generating a dynamic web page, the method comprising:

receiving a document describing a plurality of endpoints, each of the endpoints operating on messages bound to a particular network protocol and message format, the endpoints each providing an entry point for external applications to access logic over a network, the logic providing a network service for each endpoint;

automatically generating a plurality of custom actions corresponding to the network services described by the document;

gathering the plurality of custom actions into a custom tag library, the custom tag library including custom tag handler code;

using custom tags from the custom tag library in a JavaServer page (JSP); and generating the dynamic web page from the JSP such that the custom tags in the JSP invoke the custom tag handler code which accesses the network service.

5. The method of claim 4 wherein the document is a web services description language (WSDL) document.

6. The method of claim 4 wherein the custom actions are JSP custom actions.

7. The method of claim 4 wherein the dynamic web page contains content received from the network service.

8. The method of claim 4 wherein the dynamic web page is a hypertext markup language (HTML) document.

* * * * *